Jan. 2, 1934.   A. PISACANO   1,942,184
WINDOW SHIELD WIPER
Filed Sept. 14, 1932
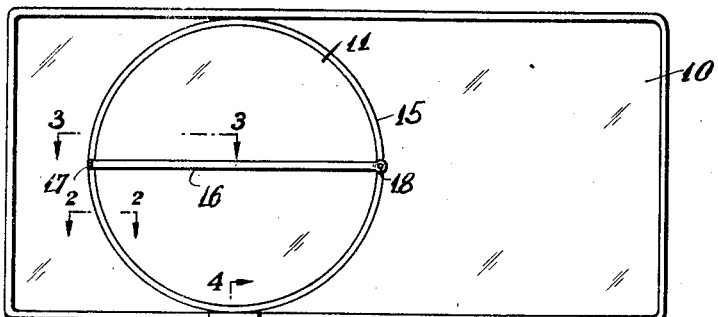
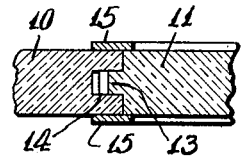
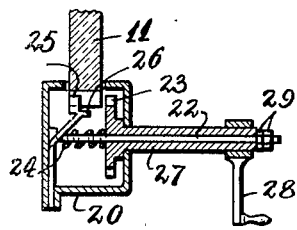
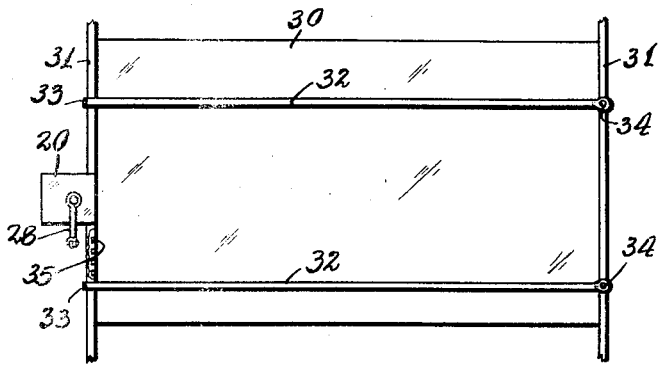
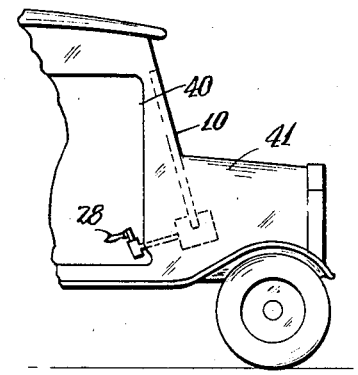
INVENTOR
ALBERT PISACANO
BY
ATTORNEY Patented Jan. 2, 1934

1,942,184

UNITED STATES PATENT OFFICE 1,942,184

WINDOW SHIELD WIPER

Albert Pisacano, New York, N. Y.

Application September 14, 1932
Serial No. 633,045

5 Claims. (Cl. 20—40.5)

This invention relates to new and useful improvements in a windshield and windshield wiper.

The invention has for an object the construction of an article as mentioned which overcomes all of the objectionable features that render the ordinary windshield and windshield wiper unsatisfactory for practical use particularly on airplanes.

Furthermore, the invention has for an object the provision of a combination windshield and wiper which is adapted for use on automobiles, airplanes and other conveyances.

As a still further object it is proposed to provide extra length in the windshield to facilitate the application of chemical baths, or hot gases, or electrical means for heating to offset frost and moisture.

Furthermore, as another object of this invention it is proposed to arrange the wiper stationarily and to construct the windshield movably relative to the wiper in a manner to facilitate cleaning and furthermore to facilitate the application of chemical baths, or hot gases upon the windshield to offset frost and moisture.

A still further object of this invention is the provision of an arrangement whereby the windshield is composed of several sections certain of said sections being movable relative to a wiper for the purpose previously explained.

A still further object of this invention is the provision of an arrangement whereby the movable section of the windshield may be conveniently moved or held in a stationary position.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a front elevational view of a windshield constructed according to this invention.

Fig. 2 is a fragmentary enlarged horizontal sectional view taken on the line 2—2 of Fig. 1.

Fig. 3 is a fragmentary horizontal sectional view taken on the line 3—3 of Fig. 1.

Fig. 4 is a fragmentary vertical sectional view taken on the line 4—4 of Fig. 1.

Fig. 5 is a front elevational view of a windshield constructed according to the modification of the invention.

Fig. 6 is a side elevational view of a motor vehicle with a windshield according to this invention.

The windshield wiper as illustrated in Figs. 1-4 inclusive, comprises a windshield 10 having a movable section 11 and a stationary wiper 12 arranged in conjunction with the movable section. More particularly the windshield 10 is shown of rectangular form and the movable section 11 in a form of a disc rotative in and forming a part of the windshield 10. The disc 11 is rotatively supported by reason of a toothed flange 13 extending from its periphery and engaging within a groove 14 formed in the inner adjacent sides of a windshield 10. To insure proper holding of the disc 11 in place, there is located on opposite sides support rings 15 secured by cement or any other arrangement upon the stationary portion of the windshield and overlapping the rotative portion.

The wiper 12 comprises a squeegee clamped within a channel-shaped member 16 which is hinged at one end 17 on one side of one of the rings 15 and at the other end is provided with a catch 18 adapted to act in conjunction with the ring 15 so that the squeegee 12 is normally engaged against the disc 11. Preferably the squeegee 12 should extend one half the way across the disc 11 since this is sufficient to clean the entire disc when the latter element is rotated thru 360 degrees. The arrangement allows the channel-shaped member 16 to be pivoted around the hinge 17 and expose the squeegee 12 for replacing purposes.

A means is provided for moving the movable section, or disc 11, and comprises a casing 20 which is attached upon the frame 21 of the windshield 10. A stud 22 rigidly projects from one side of the casing at right angles to the disc 11. A gear 23 is rotatively mounted upon the stud 22 and is adapted in a certain position to be free from the toothed flange 13 or be in another position in which its teeth engage with the teeth of the flange 13. A means is provided for urging the gear 23 into its position out of mesh with the teeth 13 and comprises a helical spring 24 coaxially on the stud 22 and acting between the casing 20 and the gear for normally urging it in one direction.

A resilient catch is provided for normally engaging the teeth of the flange 13 for holding in the disc element against turning and comprises a resilient member 25 engaging against the teeth of the disc 11 and mounted upon the casing 20. The resilient catch 25 is provided with a finger 26 adapted to be engaged by the side of the gear 23 when the latter element is moved into its meshed position so as to cause the catch to be bent out from its engagement with the teeth of the disc 11.

The gear 23 is provided with a hub 27 extending from the casing 20 and supporting the handle 28 by which the gear may be rotated. Limit nuts 29 are engaged upon the stud 22 and limit the extension of the hub 27 under the resilient action of the spring 24. In other words the nuts 29 limit the position of the gear 23 as shown. The handle 28 may be depressed to cause the gear 23 to assume its position of mesh and then the limit nuts 29 may be screwed further upon the stud 22 so as to act against the hub 27 and hold the gear 23 in its condition of mesh.

In Fig. 5 a modification of the invention has been disclosed in which the rectangular windshield 30 is slidably supported within a frame 31, and stationary wipers 32 spaced from each other are supported upon the frame 31 and act against the side of the windshield. Each of the wipers 32 are hingedly mounted at one of their ends 33 and on their other ends are provided with catches 34 to hold them in their operative positions. The details of the wipers 32 will not be given, suffice to say that preferably they should be formed of channel-shaped members and provided with a squeegee.

A means is arranged for manually moving the windshield 30 relative to the wipers and comprises rack teeth 35 arranged upon one of the sides of the windshield and capable of meshing with a moving means similar to the means disclosed in Fig. 4, the details of construction thereof will not be given here since the parts may be readily recognized. In detail, the casing 20 attached upon the frame 31 contains the mechanism shown in Fig. 4 operable by the handle 28. By means of the handle 28 the windshield may be caused to move up and down past the wipers. The advantage of this arrangement resides in the fact that chemical baths, or hot gases, or electrical means of heating may be impinged upon the portions of the windshield 30, outside of the wipers 32 for the purpose of offsetting frost and moisture upon the windshield.

In Fig. 6 a motor vehicle 40 has been illustrated equipped with the windshield illustrated in Figs. 1-4 inclusive. Particular attention is called to the setting of the windshield on the vehicle. It should be noticed that half of the windshield is set above the hood 41 of the vehicle, while the remaining portion below. This arrangement allows the heat within the hood of the motor to act against the lower half of the windshield and so rid the windshield from frost and moisture when the movable section 11 is caused to turn. Thus when the outer section becomes wetted or frosted the handle 28 may be operated to cause the outer section to assume the lowered position and cause the clean lower section to assume an upper position.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, comprising a movable windshield section, and means for moving said windshield section comprising a casing, a stud extending through said casing at right angles to said movable section, a gear upon said stud adapted to assume a position with its teeth in mesh when teeth upon the movable section or a position out of mesh and having a tubular hub extending to the exterior of the casing, resilient means acting against said gear for urging it into the latter mentioned position, a resilient catch normally engaging the teeth of said movable section and automatically displaced by said gear upon the gear being moved into its meshed position, a handle upon said hub, and limit nuts upon said stud acting against the edge of said hub.

2. In a device of the class described, comprising a movable windshield section, and means for moving said windshield section comprising a casing, a stud extending through said casing at right angles to said movable section, a gear upon said stud adapted to assume a position with its teeth in mesh when teeth upon the movable section or a position out of mesh and having a tubular hub extending to the exterior of the casing, resilient means acting against said gear for urging it into the latter mentioned position, a resilient catch normally engaging the teeth of said movable section and automatically displaced by said gear upon the gear being moved into its meshed position, a handle upon said hub, and limit nuts upon said stud acting against the edge of said hub, said means for urging said gear comprising a spring arranged upon said stud and acting between said casing and gear.

3. In a device of the class described, comprising a movable windshield section, and means for moving said windshield section comprising a casing, a stud extending through said casing at right angles to said movable section, a gear upon said stud adapted to assume a position with its teeth in mesh when teeth upon the movable section or a position out of mesh and having a tubular hub extending to the exterior of the casing, resilient means acting against said gear for urging it into the latter mentioned position, a resilient catch normally engaging the teeth of said movable section and automatically displaced by said gear upon the gear being moved into its meshed position, a handle upon said hub, and limit nuts upon said stud acting against the edge of said hub, said resilient catch being mounted within said casing and having a finger engageable against the side of said gear to cause bending of the catch out of its operative position upon motion of said gear into its meshed position.

4. In a device of the class described, comprising a movable windshield section, and means for moving said movable windshield section, comprising teeth formed upon the windshield section, a gear engageable with said teeth, means for revolving said gear, means for urging said gear out of engagement with said teeth, means for holding said gear engaged with said teeth, and means for holding the windshield section stationary when said gear is out of engagement with said teeth.

5. In a device of the class described, comprising a movable windshield section, and means for moving said movable windshield section, comprising teeth formed upon the windshield section, a gear engageable with said teeth, means for revolving said gear, means for urging said gear out of engagement with said teeth, means for holding said gear engaged with said teeth, and means for holding the windshield section stationary when said gear is out of engagement with said teeth, comprising a resilient catch normally engaging said teeth, and means for forcing the said catch out of engagement with said teeth when said gear is brought into engagement with said teeth.

ALBERT PISACANO.